UNITED STATES PATENT OFFICE 2,393,006

FILM

Joseph F. Vincent, Akron, Ohio, assignor to Wingfoot Corporation, Akron, Ohio, a corporation of Delaware No Drawing. Application December 13, 1943, Serial No. 514,183

1 Claim. (Cl. 117—7)

This invention relates to a coated rubber hydrochloride film. The coating is composed of a benzene-soluble copolymer of vinyl chloride and vinylidene chloride.

Rubber hydrochloride film is relatively moisture resistant. When coated with a very thin film of the copolymer, it is much more moisture resistant, and the rubber hydrochloride film of this invention is so coated. The resulting sheet not only partakes of the increased moisture resistance of the coating but also the good tear resistance and other desirable properties of the rubber hydrochloride film.

Commercial rubber hydrochloride film is formed from a solution of rubber hydrochloride in a solvent, such as benzene, by casting the solution on a film-forming surface and evaporating the solvent. On evaporation of the solvent, the rubber hydrochloride shrinks very appreciably. It would shrink still further if such shrinking were not prevented by the adherence of the cast film to the film-forming surface. Due to this tendency of the film to shrink and the prevention of the shrinking by the adherence of the cast film to the film-forming surface, the finished film, when stripped from this surface, is unstable. When heated or treated with solvent, it shrinks.

The solvents usually employed for the solution of rubber hydrochloride are the same as those commonly employed for the solution of the copolymer. It is, therefore, difficult to coat the film with the copolymer because the application of the coating solution to the film tends to dissolve the film and remove the stresses within it. The film does not shrink evenly, but curls, and it does not lie flat.

There are various ways of preventing such distortion of the film. A preferred way is to keep the film under tension during the treatment with the solvent-containing solution. This prevents its shrinking. If it is kept under tension so as to maintain its unshrunken dimensions, the resulting film will lie flat and can be handled in much the way that uncoated film is handled.

The action of the solvent on the film, even though the film is maintained under tension, causes the coating to blend with the film material in an interlayer between the film and the coating. This interlayer is, for example, formed by applying the copolymer to the rubber hydrochloride film in a benzene solution. The benzene solution softens and dissolves the rubber hydrochloride film, causing the contacting portions of the coating and the film—both of which are in solution—to blend with one another. On evaporation of the solvent, the finished product comprises the film (a large portion of which is free from the copolymer coating) and the coating (a large portion of which is free from the rubber hydrochloride of the film) and between these an interlayer which is composed of rubber hydrochloride blended with the copolymer. This blending gives a very strong bond so that the coating is inseparable from the film without destruction of the film.

The coating composed essentially of the benzene-soluble copolymer of vinyl chloride and vinylidene chloride is heat sealable. Whether copolymers formed from these monomers are soluble or insoluble in benzene depends upon the proportion of the copolymer which is formed from the vinyl chloride and the proportion which is formed from the vinylidene chloride. The soluble copolymer used in carrying out this invention, on analysis, shows that it is formed from a mixture of the two monomers containing at least about 40 or 45 per cent and not more than 70 or 75 per cent of vinylidene chloride. The coating may be formed from, for example, 50 or 60 parts of vinylidene chloride and a corresponding amount of vinyl chloride to make 100 parts. It is readily soluble in benzene, toluene or ethylene dichloride up to a concentration of about 10 per cent by weight. A commercial form of the copolymer is the soluble type of Saran manufactured by Dow Chemical Company, of Midland, Michigan. The copolymer coating may contain coloring matter, plasticizers, heat stabilizers, etc., in addition to the copolymer material.

The coated sheet may, for example, be formed by taking a sheet of uncoated rubber hydrochloride 0.001 inch thick, weighting it along the edges or clamping it along the edges so that it will not shrink, and then applying to it a solution containing 30 parts of the copolymer per 100 parts of benzene. The sheet is then kept under tension until the solvent dries.

A coating thickness on the film of at least 0.002 inch will ordinarily be satisfactory. The coating may be as thin as 0.0005 inch and may be thicker, up to several thousandths of an inch.

A series of samples of rubber hydrochloride film 0.00185 inch thick containing several per cent of butyl stearate as a plasticizer was coated with the soluble copolymer of vinyl chloride and vinylidene chloride manufactured by Dow Chemical Company and sold by them as Saran B-130. A 28 per cent solution in benzol was coated on the samples to a thickness of about 0.0015 inch, averaging 42.2 pounds of coating per ream of 3000 square feet.

In this way, the moisture transmission of the film, which for uncoated film of this thickness usually runs about 8 to 9 grams per thousand square inches of surface in twenty-four hours, was reduced to about 1.3 grams.

The copolymer is heat sealable and forms a strong bond either with itself or with rubber hydrochloride film. The film may be used for forming a package which may be heat sealed by sealing one rubber hydrochloride surface to another or by sealing the copolymer coating to rubber hydrochloride or by sealing one copolymer surface to another. The sealing point for uniting two surfaces of the copolymer is about 30° F. below that required for uncoated rubber hydrochloride film. Therefore, in uniting the coated surfaces by application of heat through the rubber hydrochloride film, the coating may be heated above its softening point and may even be converted to a thoroughly molten liquid before the rubber hydrochloride is heated to its softening point. The bond formed in this way is exceedingly strong because there is no longer any line of demarcation between the two coating layers, and the copolymer is firmly bonded to the rubber hydrochloride.

The moistureproofed sheet may be used to advantage in the packaging of materials which must be kept absolutely dry, such as smoking tobacco, deliquescent materials, dehydrated foods, etc. A sheet for this purpose will ordinarily be no less than about 0.001 inch thick but may be thinner or thicker, depending upon the degree of moisture resistance required, the strength of film that is necessary for the particular problem at hand, etc.

What I claim is:

The method of making a coated film which comprises placing rubber hydrochloride film under tension without appreciably stretching the same, and then applying to the film a solution in a rubber hydrochloride solvent of a benzene-soluble copolymer formed from vinyl chloride and vinylidene chloride, and allowing the solvent in the solution of the copolymer to dissolve the surface of the rubber hydrochloride film, and then evaporating the solvent while maintaining the film under tension.

JOSEPH F. VINCENT.